United States Patent [19]

Stenzel et al.

[11] Patent Number: 4,774,676
[45] Date of Patent: Sep. 27, 1988

[54] LINEAR DIGITAL FLOWMETER

[75] Inventors: Wallace I. Stenzel, Thiensville; Kenneth R. Payne, Menomonee Falls, both of Wis.

[73] Assignee: Waukee Engineering Company, Milwaukee, Wis.

[21] Appl. No.: 669,090

[22] Filed: Nov. 7, 1984

[51] Int. Cl.⁴ .................... G01F 1/245; G01F 23/50; G01N 15/06
[52] U.S. Cl. .................. 364/510; 73/861.56; 73/296; 250/577; 340/606
[58] Field of Search .................. 364/509, 510; 73/293, 73/861.56, 861.55; 340/606; 250/577

[56] References Cited

U.S. PATENT DOCUMENTS

| | | | |
|---|---|---|---|
| 3,976,862 | 8/1976 | Carbelo | 364/510 |
| 4,084,426 | 4/1978 | Gales | 73/293 X |
| 4,123,227 | 10/1978 | Heim et al. | 250/577 X |
| 4,335,618 | 6/1982 | Bucsky et al. | 73/861.56 |
| 4,355,238 | 10/1982 | Ruell | 250/577 |
| 4,425,794 | 1/1984 | Duesbury | 250/577 X |
| 4,440,028 | 4/1984 | Ramlow | 73/861.55 |
| 4,481,595 | 11/1984 | Schiessl et al. | 73/293 X |
| 4,520,883 | 6/1985 | Fukuda | 250/577 X |
| 4,566,337 | 1/1986 | Smart | 73/861.56 |
| 4,586,143 | 4/1986 | Kaneyasu et al. | 364/509 |
| 4,630,485 | 12/1986 | Wastl, Sr. | 73/861.56 |
| 4,729,238 | 3/1988 | Samborsky | 364/510 X |

Primary Examiner—Parshotam S. Lall
Assistant Examiner—Joseph L. Dixon
Attorney, Agent, or Firm—Andrus, Sceales, Starke & Sawall

[57] ABSTRACT

A linear digital flow meter includes a float in a passageway as is located positioned with the rate of flow. A sight glass tube is secured to the end of the unit and a rod connects the float to a tube. A generally H-shaped housing has the tube located in an opening in the cross bar with a light chamber to one side and a detector chamber to the opposite. A bank of LEDs in the light chamber is aligned with a transmitting slot and a bank of phototransistors is aligned with a receiving slot in the detector chamber. A shadow mask between the phototransistors and the slot concentrate the light so the phototransistor receive light according to the length of rod in the sight glass. A bottom connector chamber is in the bottom of the housing with L-shaped passages to the light and detector chambers with the appropriate leads to the lamp and detector chambers. A multiplexer connects the phototransistors to a microprocessor which stores and processes the signal. The microprocessor has a programmable range selection unit, a limit control unit and an output circuit establishing a voltage output signal unit and a current output signal unit to produce voltage and current signals proportional to the flow rate.

21 Claims, 4 Drawing Sheets

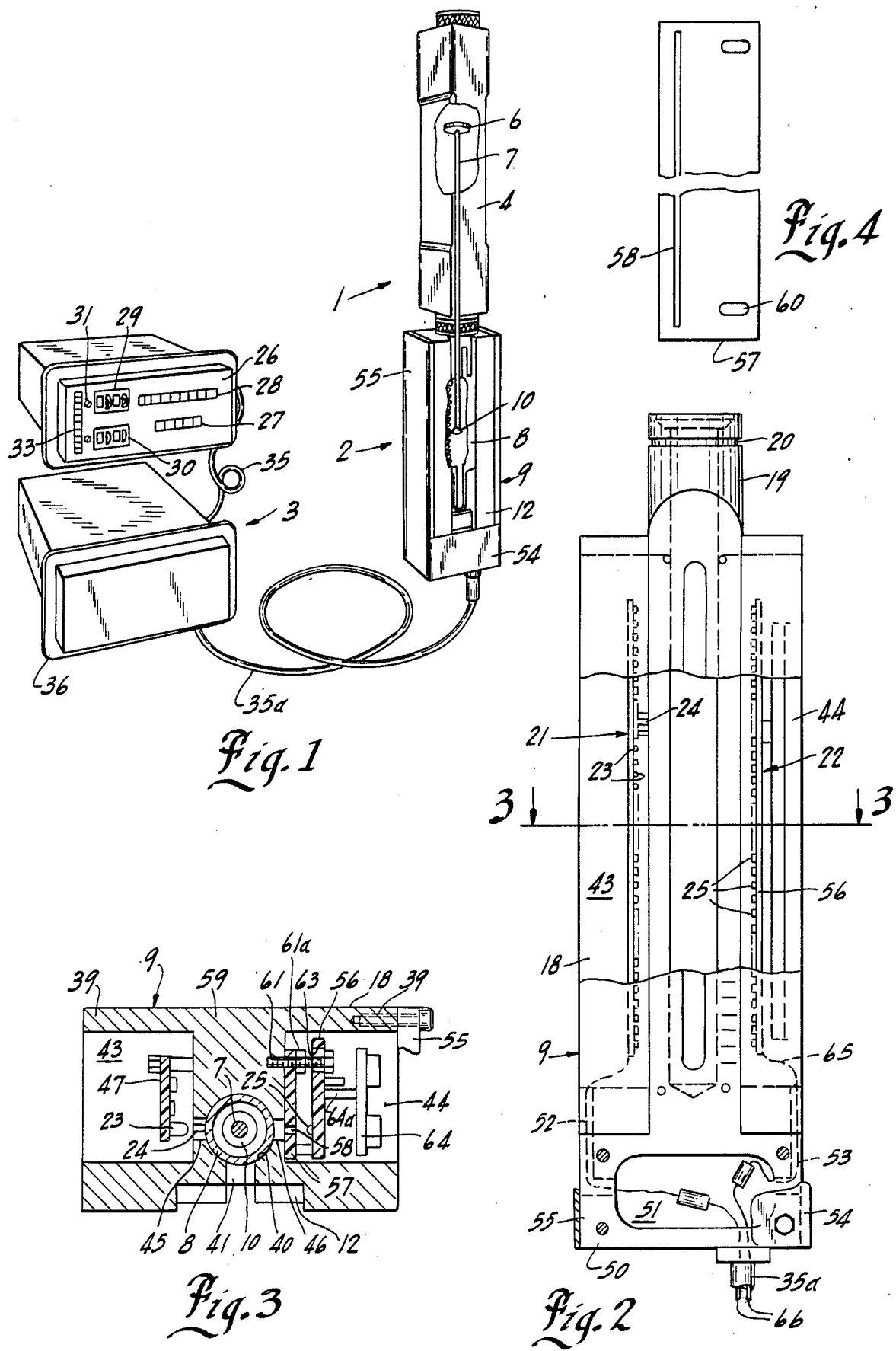

LINEAR DIGITAL FLOWMETER

BACKGROUND OF THE PRESENT INVENTION

Reference is hereby made to the Microfiche Appendix "A" forming a portion of this specification and containing 1 microfiche and a total of 22 frames.

This invention relates to a linear digital flowmeter for monitoring the flow of fluid through a passageway.

In industrial applications various fluids are used. The amount of fluid flow must be often monitored and/or controlled for proper system control and operations. For example, a boiler or other fired equipment may require appropriate monitoring of the fuel flow to the burner unit. The assignee of this invention has for many years sold a highly effective flowmeter such as shown in U.S. Pat. No. 4,440,028 issued Apr. 3, 1984. The flowmeter generally includes a flow chamber connected in series with the flow passageway and a readout chamber coupled to the flow chamber. A float member within the vertical readout chamber is positioned in accordance with the flow rate. The float is connected by a connecting rod to a readout device located in the readout chamber and projecting downwardly therefrom. The readout chamber for example may be provided with a graduated scale and the readout device may be an indicator disc having a relatively sharp edge. The position of the disc on the graduated scale, of course, provides a direct readout of the flow rate. The above noted patent discloses a limit readout control including a portable electric sensor for monitoring the preselected upper and lower flow limit. In certain applications, a continuous readout of the flow rate may be desirable if not essential.

The prior art patents generally disclose various limit type control but do not disclose suitable continuous readout device. A search of the available readout devices by the inventor has failed to locate any apparatus suitable for providing a continuous and accurate readout of the flow rate.

SUMMARY OF THE PRESENT INVENTION

The present invention is particularly directed to a continuous readout apparatus for providing a signal essentially proportional to the actual flow and driving a digital analog readout means for providing a continuous output closely related to the flow rate. The output can, of course, be integrated through appropriate circuitry to provide a record of total volumetric flow over a time period. In accordance with the teaching of the present invention, a support is provided having a plurality of light sources secured to one side of the readout chamber and located in closed spaced relation, and thereby generating a light bar aligned with the chamber. A plurality of photosensitive devices are similarly mounted to the opposite side of the chamber and essentially in close spaced relation thereto. The light passes through the chamber to the location of the sensor array. The light bar is interrupted by the rod and disc. The indicator disc defines a relatively sharp cutoff of the light bar and thereby defines a total light bar length directly proportionate to the position of the indicator. The output signal is thus proportional to the length of the light bar and further provides an accuracy corresponding to the accuracy of the float mechanism. Long usage of the float mechanism and indicator disc has resulted in an accurate mechanical relationships between actual flow and the position of the indicator, thereby resulting in an accurate conversion. The light bar length is therefore, in the preferred construction, readily converted to an accurate signal related to the actual flow.

The signal is transmitted to a microprocessor based control unit for processing the disc-related signal and producing a proportional output signal for connection to any suitable output device. The control unit also provides for driving of digital readout devices and other monitoring of factors and states related to the flow rate. In a particularly unique and preferred embodiment of the present invention, the light bar consists of a substantial plurality of small light emitting diode (LED) lamps, such as on the order of five lamps per inch. A bank of phototransistors is similarly mounted ot the opposite side of the readout chamber 2. The bank of phototransistors may include, for example, 10 units per inch to provide the desired resolution of the output signal. The light beam is accurately aligned with the bank of phototransistors by use of a shadow mask located before the tube and the phototransistors, and with the mask and phototransistor mounted for adjustment into proper alignment.

An electronic scanning unit continuously monitors the bank of phototransistors and detects the relative length of the light bar. A multiplexing unit or other readout system is connected to the phototransistors and to a readout circuit, in a preferred construction, the circuit includes the multiplexing unit connected to a microprocessor based control and signal processing unit to record the output state on a continuing basis. The microprocessor system includes a programmable flow range select module and a program to convert the outputs of the phototransistors to a proportional voltage signal and a corresponding current signal for connection to suitable output devices such as alarm means, flow control means or the like. The microprocessor may advantageously be constructed with a range select chip which is releasably mounted to permit changing of any given unit to a desired flow range to be monitored. The control unit also provides various optional controls such as a programmable high/low limit module, current flow create digital readout with a bar graph illustration and a totalized digital readout, as well as computer interface modules for coupling of the control to another computer.

The invention in a preferred commercial construction includes a generally H-shaped housing having a heavy cross bar and forming a lamp chamber and photosensitive detector chamber to opposite sides. The indicator tube is located in an opening in the cross bar and connected to the chambers by similar light coupling slots in the cross-bar. A bank of LED lamps and a bank of phototransistors are located in the chambers to the opposite sides of the housing. The LED lamp bank creates the light bar which is transmitted through the tube to the bank of photo transistors. A connector chamber is formed on the lower end of the housing. The lamp power wiring and the phototransistor power and output wiring is provided within the respective chambers, and the connecting leads passed through passageway into the connector bank for connection to a wiring cable.

The present invention thus provides a reliable and versatile monitor for detecting flow, pressure and the like by monitoring the position of a float member in a transparent support.

DESCRIPTION OF THE DRAWING FIGURES

The drawings furnished herewith illustrate a preferred construction of the present invention in which the above advantages and features are clearly disclosed as well as others which will be readily understood from the following description.

In the drawings:

FIG. 1 is an elevational view of a gas flowmeter with a monitor alarm unit coupled thereto;

FIG. 2 is an enlarged horizontal section through a flow indicator unit including a photosensitive position monitor and taken generally on line 2—2 of FIG. 1;

FIG. 3 is a side view of the unit shown in FIGS. 1 and 2;

FIG. 4 is a elevational view of a mark shown in FIGS. 2 and 3;

DESCRIPTION OF THE ILLUSTRATED EMBODIMENT

Figure 5:
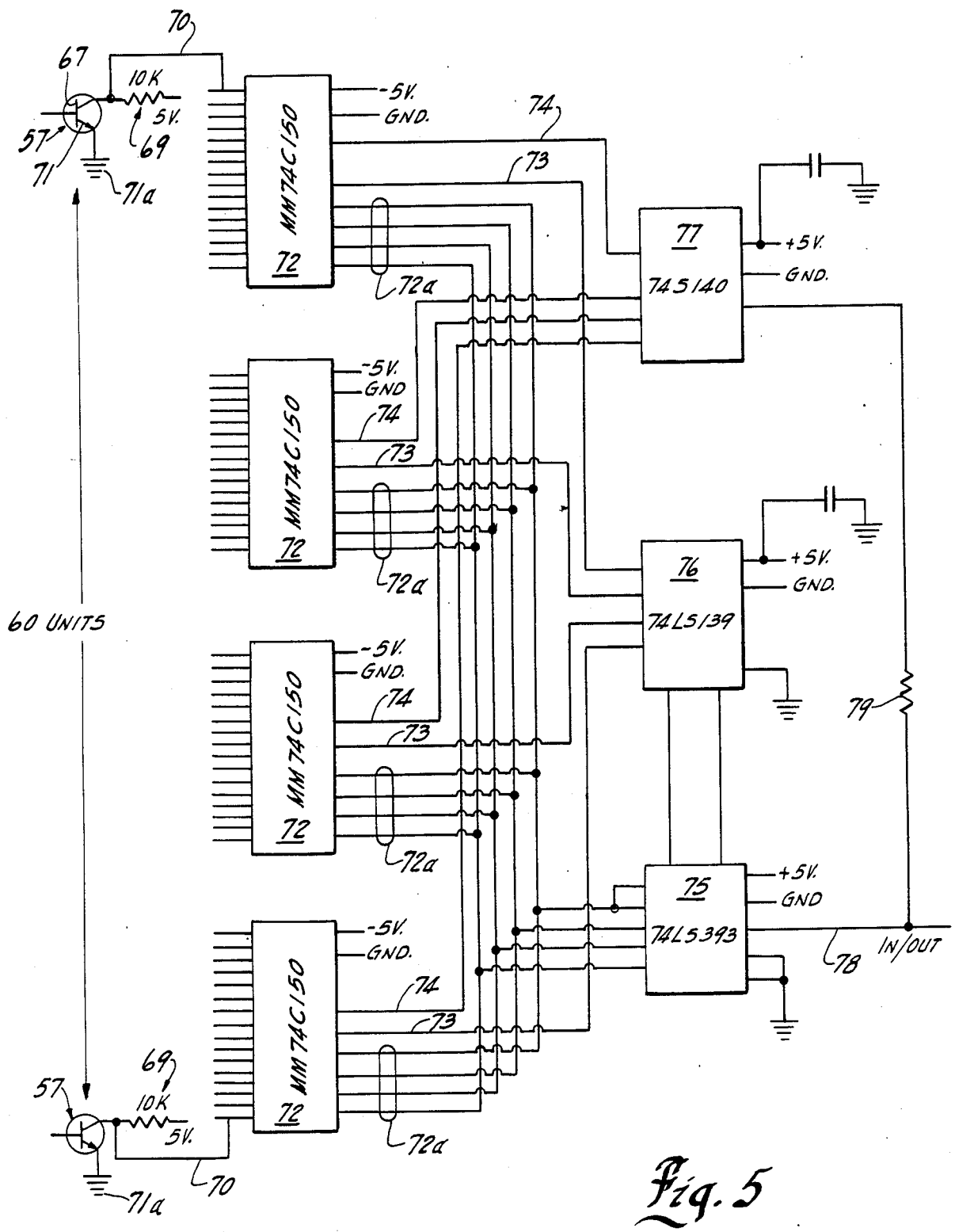
FIG. 5 is a schematic circuit of a multiplex circuit for reading an output of the flow indicator unit.

Referring to the drawings and particularly to FIG. 1, a gas flowmeter 1 such as shown as in prior U.S. Pat. No. 3,150,360, is shown having a position monitor unit 2, coupled thereto. The monitor unit 2 is connected to a microprocessor based electronic signal processing and control unit 3 to provide outputs in acordance with the flow rate. The units 2 and 3 are constructed in accordance with the present invention. The flowmeter comprises a casing 4 having a tapered chamber 5 connected in a gas flow line such that the gas flow tends to lift a float 6, which is shown as a generally disc-shaped member. The float 6 has an elongated float rod or stem 7 extending into a transparent oil-filled tube 8 which is substantially enclosed in a tubular sensor unit 9 and coupled to drive the monitor unit 2. The stem 7 bears a pointer 10 for indicating the position of the float 6 relative to a readout scale 12. The float 6, stem 7 and pointer 10 are the equivalent of any generic "pointer" and the tube 8 is the equivalent of any transparent portion coacting with a pointer and a scale. Obviously, the transparent portion of the flowmeter need not be tubular and the pointer need not be of the construction herein disclosed but may, for example, be of the type swinging on a pivot and such constructions are equally useful with the present device. The sensor unit 9 is photoelectrically coupled to monitor the position of pointer 10 and is coupled to the electronic control unit 3 which may include a suitable alarm, an indicator, readouts, and the like. The present invention is particularly directed to improvement in the positioning monitor unit 2 and related control unit 3. Consequently the other components of the illustrated embodiments are not described in further detail other than as required to fully describe the present invention.

Referring particularly to FIGS. 2 and 3, the position sensor unit 9 is a photoelectric sensor having an outer housing 18 of a suitable rigid protective material such as metal or plastic. The unit 9 includes a top mounting hub 19 having an annular recess 20. A coupling ring secures the housing 18 to the flowmeter 1. A lamp unit 21 is secured to one side of housing 18 while a light detector unit 22 is secured in the opposite side of housing 18. The lamp unit 21 includes a plurality of LED lamps 23 which establish a light beam bar 24 which is transmitted through the tube to detector unit 22. The detector 22 includes a plurality of light sensitive elements 25 which generate output signals in accordance with the presence and absence of light. The detector 22 is thus sensitive to the breaking of the light bar 24, and is connected to transmit related signals to the control unit 3 for processing.

Lamp unit 21 and detector unit 22 are the connected to the monitor unit 3 which includes an electronic signal processing circuit to drive the units 21 and 22 and to process the output of the detector unit 22.

In the illustrated embodiment, the monitor unit 3 is shown including an output unit 26 having a current readout display 27 and a total readout display 28 to respectively provide a digital display of the instantaneous flow rate and the total flow from a reference time. In addition, the unit includes a high limit input control dial 29 and a low limit dial 30 for setting the monitor to detect maximum and minimum flow rates. Indicating lamps 31 are associated with dials 29 and 30. Finally, a visual bar graph display 33 is provided on the output unit. The output unit 26 is connected by a suitable cable 35 to a circuit monitor 36 connected by cable 35a to monitor 2 and within which the drive controls and the output signal processing circuit is housed. A preferred circuit is shown in FIG. 4.

More particularly, the housing 18 has a substantially H-shaped cross section, as shown in FIG. 3, with a relatively heavy cross arm from which the arms 39 project to define appropriately located recesses or chambers to opposite sides of the housing. A longitudinal opening 40 through the cross arm portion receives the glass tube 8. A slot 41 in the front wall exposes the tube 8 for visual viewing of the position indicator disc 10. The front wall of the housing has a slight recessed adjacent the viewing slot 41. A scale unit 12 is secured within the recess portion which in cooperation with the indicating disc 10 provides a visual readout of the flow rate.

The H-shaped cross sectional housing defines a lamp recess or chamber 43 to one side of the housing and a detector chamber 44 to the opposite side of the housing. Similar slots 45–46 are formed in the base portion of the chambers 43–44 in alignment with the sight glass tube 8. A lamp unit 21 in the lamp chamber 43 creates the light bar 24 which is transmitted through the slots and tube to the detector unit 22 in the opposite detector chamber 44.

The lamp unit 21 consists of a circuit board 47 to which the plurality of small lamps, such as light emitting diodes 23 are secured in close space alignment. A substantial plurality of lamps 23 are located in close spaced relations to develop an essentially continuous level light bar 24. For example, about five LED diodes per inch have been satisfactorily used. The light emitting diodes 23 have a suitable circuit connections and components on the board 47. Electrical connection to the diodes 23 is made through a cable system to the printed circuit board at the lower end of the board.

In the illustrated embodiment of the invention, a connector housing portion 50 is integrally formed with the lower end of the housing 18. The connector portion 50 includes a front opening recess or chamber 51 with L-shaped passageways 52 and 53 connecting the chamber to the respect lamp chamber 43 and detector chamber 44, respectively. The connector chamber 50 is closed by a removable front cover 54 which is secured in place by suitable screws or the like.

Similar closure plates 55 are similarly secured to the opposite sidewalls of the housing 18 to close the respective lamp and detector chambers 43 and 44.

The light detector unit 22 includes the plurality of photosensitive detectors 25 such as phototransistors. The phototransistors 25 are secured to a suitable circuit board 56 which is mounted within the chamber 44, with the phototransistors 25 aligned with the light receiving slot 46. Although any desired number of detector elements 25 can be used depending on the desired resolution, the inventor has used 10 detectors per inch to provide a highly satisfactory and accurate readout of the flow rate.

A shadow mask 57 is secured to the chamber between the base slot 46 and the phototransistor board 56. The mask 57 adjustably mounted and includes a narrow opening or slot 58 which is aligned with the center of tube 8 and the phototransistors 25.

In an optimum construction of the present invention, particularly providing accurate detection and response, the shadow mask 57 is interposed in the close spacement between the detection tube 18 and the bank of phototransistors 25.

The mask 57 is a suitable opaque member. Accurate alignment of the slot 58 is significant to establishing the desired response. The slot 58 may be typically on the order of 1/16 to 3/64 of an inch to accurately place the beam 24 from the LED diodes 23 onto the phototransistors 25. In the illustrated embodiment of the invention, the mask 57 a rigid member and is bolted to the inner base 59 of the phototransistor detector chamber 44. The mask 57 is shown with three longitudinally spaced mountings slots 60. Clamping studs 61 extend through the slots 60 into the base wall 59. A clamp nut 61a rigidly and firmly affixes the mask 57 in position. The slots 60 provide for lateral alignment with the transparent tube 8 and thereby with the light beams 24. The phototransistor circuit board 56 is similarly mounted and located with respect to the mask 57 and particularly with respect to the shadow board slot 58. Thus, the circuit board 56 has a plurality of laterally extending slots 63 and is also mounted on studs 61 which provide for accurate alignment of the phototransistors 25 with the slot 58 and thereby with the transmitted light beams 24. The inventor has found that the combination of the shadow mask 57 and transistor board with the appropriate adjustable mountings produces an acurate recording of the flow rate.

A signal multiplexing circuit board 64 is mounted to the backside circuit board 56, as by a multiple socket connector 64a and provides for coupling of the phototransistors 25 to the monitor unit 3, for driving the phototransistors and transmitting of the individual outputs of each phototransistors to the unit 3.

The wiring connection 65 for the individual detectors 25 is passed from the detector chamber 44 through the L-shaped passage 53 into the connector chamber 51.

The common cable 35a is mounted to the lower end of the connector chamber 51 and has appropriate leads 66 connected to the respective lamp wiring for LEDS 23 and detector wiring for phototransistors 25 within the connector chamber 51. The front cover provides a total enclosure of the connections.

The output of the phototransistor unit 22 is a signal proportional to the position of the flow indicator 10 and such output is coupled to the control unit 3.

Figure 6A:
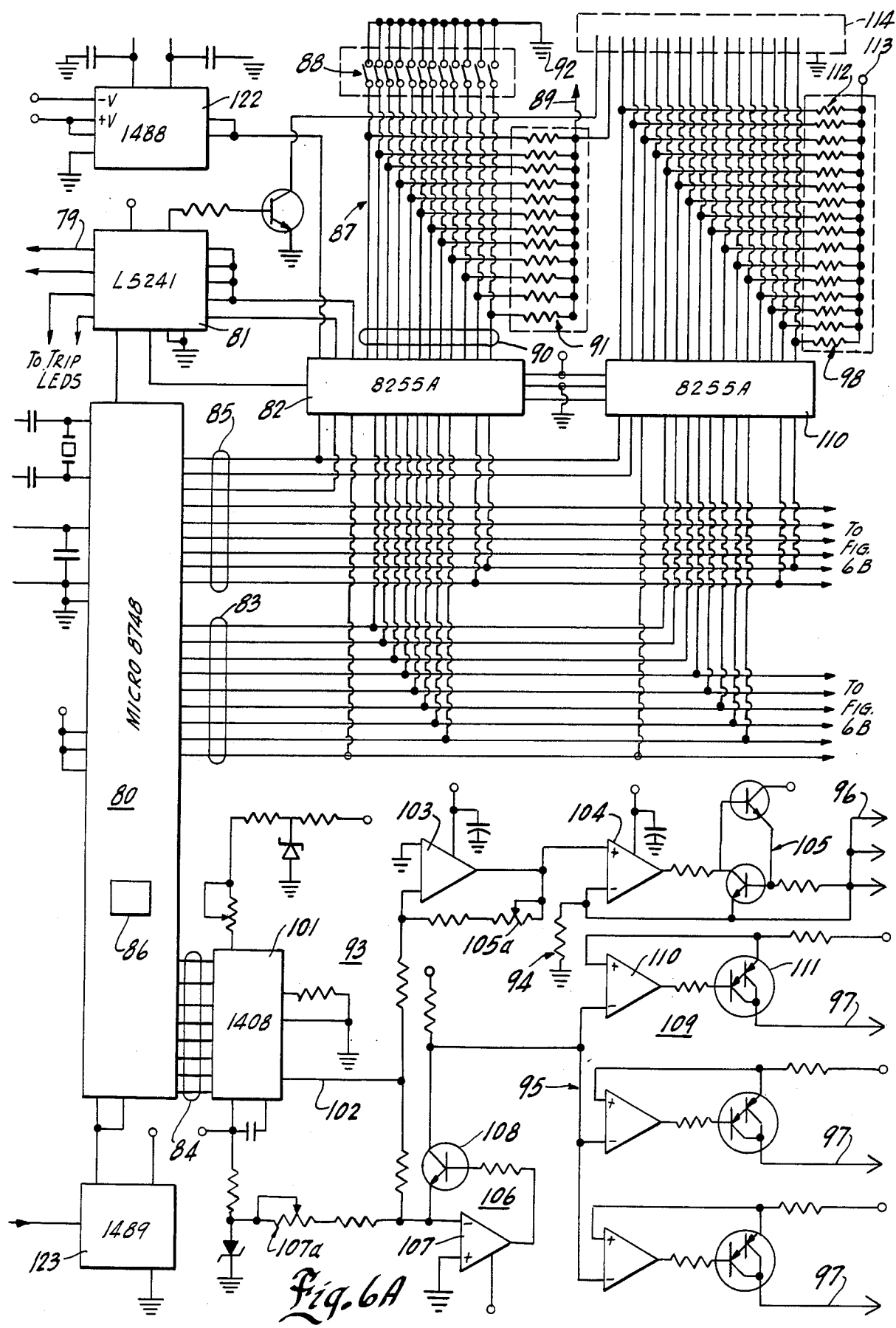
FIGS. 6a and 6b is a schematic circuit of a preferred signal processing and switching circuit using the photoelectric unit shown in FIGS. 1-4, inclusive.

Referring particularly to FIG. 5 each of the sixty phototransistors 25, of which two are shown, is an NPN transistor having the base 67 subject to the illumination from the light bar 24. The collector 68 is connected to a logic power supply 69 and to an output lead 70. The emitter 71 is connected to common ground 71a. The output lead 70 is connected to a multiplexing circuit, shown as a 24 pin integrated circuit, such as a commercially available MM 74C150 chip 72. Four of the chips 72 are used to provide the individual connection to the sixty phototransistors in an output or read circuit. The phototransistor 25 being read is selected by binary encoded input lines 73a to each chip and a chip enable line 73 to transmitt an output at line 74. The four multiplexing chips 72 are each similarly constructed and are connected for cyclical reading of the output of the phototransistors. A selection unit 75, shown as an LS74S393 unit, is connected by a four line cable to each chip 72 for binary identifying each phototransistor connected to each chip. A chip selection unit 76 is connected to the unit 75 for selective enabling of the chips 72. A signal interface output unit 77, shown as a 75S140 chip is connected to each chip 72 to transmitt the signals from the enabled chip. The latches are activated to scan the several multiplexing units 72 and thereby the individual transistors. An input line 78 is connected directly to the input port of the chip selection unit 75. An output line 79 is connected to the output port of the output unit 77. The input signal line 78 and the output signal line 79 are coupled to the monitor control unit which, as shown in FIG. 6a, includes a suitable microprocessor 80 for driving the system including the scanning of the several phototransistors 25 and essentially continuously reading the outputs thereof to develop an electrical signal portional to the instantaneous flow rate.

The illustrated control unit includes the microprocessor 80 for controlling the reading of the output of the phototransistors as well as the processing of the output signal. A coupling circuit, shown as an integrated circuit LS241 chip 81, is connected to the input line and to the output 78 from the photo detector unit 22.

The microprocessor 80 is connected to the sensor to transmitt and receive signals via an interface module unit 82, shown as 8255A chip.

The illustrated microprocessor 80 is the well known eight-bit 8748 unit having a bank of 8 I/O data lines 83, a bank of 8 output line 84 and a plurality of control lines 85. The microprocessor 80 includes the other usual voltage and control inputs and outputs as well as the usual read and right lines.

In the illustrated embodiment of the invention, the system is provided with a range selection control for monitoring of different flow ranges. In the illustrated embodiment, two different selection means are shown. In a preferred construction, the processor includes a range select program chip 86, as shown in FIG. 6a. The program chip 86 modifies the signals to provide an appropriate readout related to the range of flow selected. The program chip may be any suitable construction. For example, the inventor has used an erasable programmable read only memory chip (EPROM). Each chip is specially selected and programmed for a particular range. A plurality of the chips may be made available or purchased by a single user in applying the monitor. The use inserts the proper chip for the range of flow being monitored.

Referring particularly to the program supplied as a part of the file wrapper in this application, reference may be made to page 5 and particularly the section entitled RO # Range. This provides a typical illustration of the program. The flow range is set by the particular chip. Modification of the program for other ranges will be obvious to those familiar with programming and no further description is given. Alternatively, a manually operated switched resistance network 87 is coupled to the processor to select the operating range. The range selection unit or network 87 is a resistance network connected to the microprocessor 80. The range selection unit 87 includes a bank of switches 88 connected in a resistor matrix with a voltage supply 89 to control input line 90 of the programmable peripheral interface unit 82. The program or input lines 90 are connected to the logic voltage supply 89 through range control resistors 91. The range selection switches 88 are connected to the program lines and to common ground 92 to selectively ground the input lines and thereby program the interfaced device to set the system to operate within various ranges. The range selection input is identified by a two-digit number, with each number identified by binary encoding of the program lines related to a two place number and an exponent. Although the two range selection units 86 and 87 are shown, the system is normally to be provided with only one of the selection units. When the manually set range select switch is eliminated, the interface unit 82 is also eliminated. The microprocesser 80 is connected to the coupling unit 81 through a similar interface unit connected to a trip select circuit which is hereinafter described.

An output driver circuit 93 is connected to the microprocessor 80 and is coupled to drive a voltage drive output circuit 94 and a current drive output circuit 95. The output of the voltage drive circuit 94 is a voltage signal proportional to the position indicator disc 10 of the flow meter. The current drive output circuit 95 similarly provides a current signal, the level of which is proportional to the position of the indicator 10.

In the illustrated embodiment of the invention, a plurality of voltage ports 96 and current output ports 97 are provided. The number of ports is of course provided in accordance with anticipated usuage and in a practical application two ports generally acceptable, thus the voltage outputs may be used to drive a suitable chart recorder and a suitable monitor or the like while the current outputs are desirable to drive a programmable controller or the like.

A standard power supply, not shown, is provided for powering of the logic and load devices in the system.

The illustrated embodiment of the invention includes a plurality of other options driven from the microprocessor 80. A trip select circuit 98 provides for introducing the high and low limit signals into the control unit. A current or instantaneous digital readout circuit 99 (FIG. 6b) is also connected to the microprocessor 80 for providing a continuous update of the instantaneously flow rate on the digital readout 27, as recorded by the flow meter 1. In addition, an integrated total circuit 100 is provided connected to the microprocessor 80 for recording the totalized flow over a preselected period on the digital readout 28.

More particularly and referring to FIG. 6a, the output circuit 93 connects the 8 pin output 84 of the microprocessor to an D/A converter 101, shown as 1408 chip, which converts the binary output to an analog signal proportional to the the flow rate at that instant. The analog signal line 102 is connected to the voltage drive circuit 94 and the current drive circuit 95 to establish corresponding related operating voltages and currents.

The voltage drive circuit 94 includes an input operational amplifier 103. The output of the operational amplifier 103 is connected to an output amplifier 104 and output driving transistors 105. The setting of variable feedback resistor 105a adjust or scales the output to establish a maximum output voltage with the rod raised or in the non-setup position and ranging for example between 0 and 10 volts at voltage output ports 96 with the drop of the rod and therefore in accordance with the flow rate of the system. In the illustrated embodiment of the invention, each of the output ports 96 is connected to the output of the transistors 105. The output develops a corresponding voltage at each voltage port 96 which voltage is directly proportional to the monitored flow rate.

The current drive circuit 95 includes an input stage 106 interconnected between the analog signal line 102 and three identical current drive circuits, one for each port 97. The input state 102 includes an operational amplifier 107 connected to the output of the analog signed line 102 and to reference in series with a scaling adjusting variable resistor 107a. The resistor 107 may for example be set to establish a maximum flow. A coupling transistor 108 is driven from the operational amplifier 107 and provides a proportional signal to the three drive circuits. Each of the drive circuits is identical and only the one is described in detail.

Referring particularly to the one drive circuit 109, an operational amplifier 110 has the one input connected a reference voltage and the opposite input connected to the output of transistor 108. A Darlington type transistor 111 is connected to the output side of amplifier 110 and to the current drive port.

The output of the current drive circuit is a current signal, the level of which is proportional to the analog level signal. The current range is set by the setting of the variable resistor 107.

The voltage and current signals may of course be connected to drive any suitable load device, such as an alarm, or modulating control or the like.

Figure 6B:
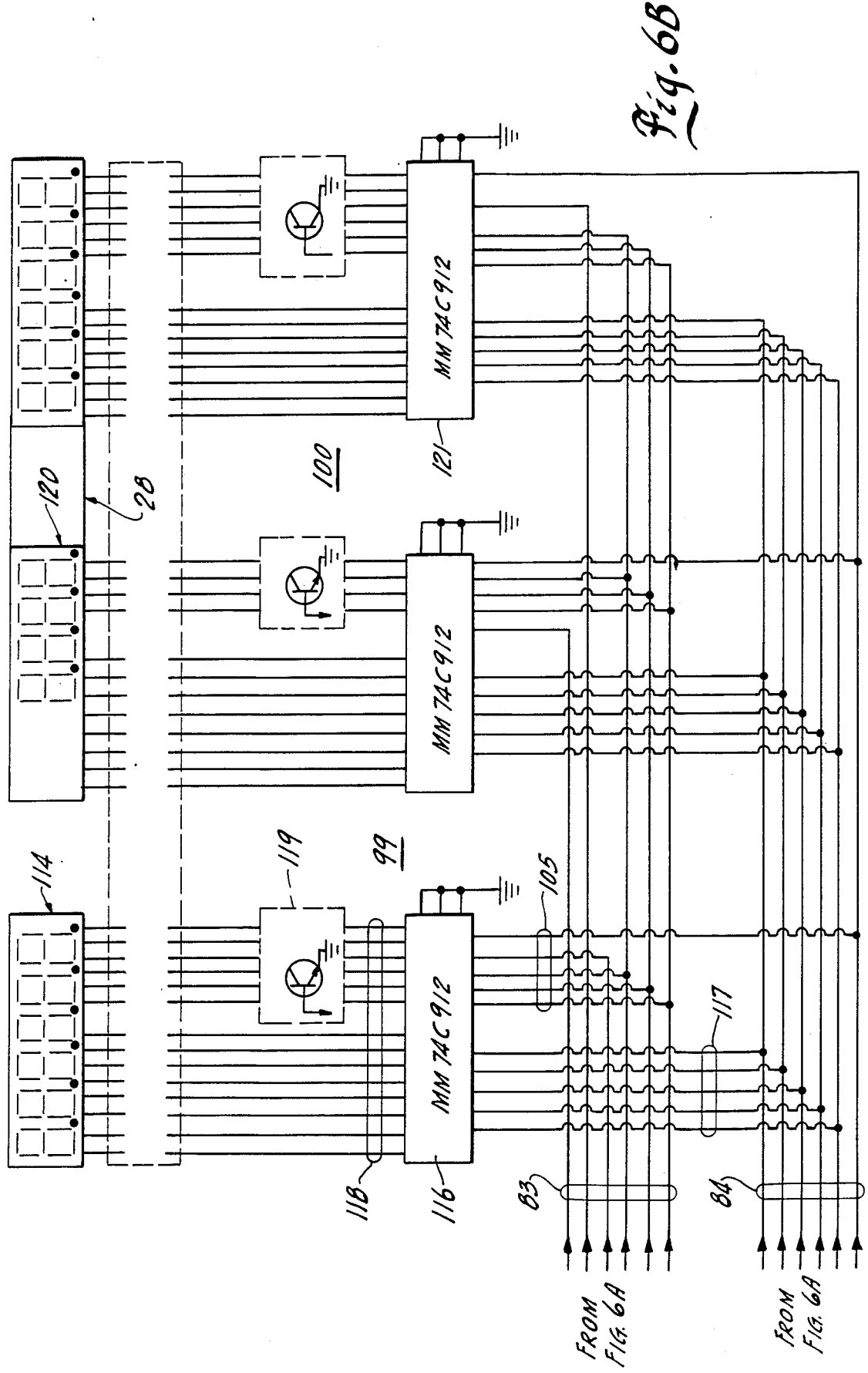

The additional readouts and limit controls 98, 99 and 100, in the illustrated embodiment of the invention shown in FIGS. 6a and 6b, are driven from the microprocessor 80.

The trip select option circuit 98 is similar to the range select circuit. The circuit 98 includes an input/output interface device 112, shown as a programmable integrated circuit and particularly an 8255A chip. The program lines 113 are connected to a voltage supply through a coordinate matrix of resistors 114 connected to a positive voltage logic supply 115 and to program inputs 116 for setting the high and low limits. Each program line 113 is connected to ground through the selection inputs 116, which are binary/decimal encoded. The low limit input is defined by two groups of four lines each for binary encoding of the one's and ten's digits. The high limit input is similarly defined two groups of four program lines each. The control and data lines of the limit option chip 8255A are appropriately connected to the control and data lines of the microprocessor 80. If the monitor indicator moves to either side of a selected range, the corresponding output signal moves into the low or high limit range as set by the trip select option unit 98 and provides an appropriate output or signal at voltage and current ports 96 and 97.

The digital readout circuit 99, shown in FIG. 6b, for the instantaneous flow rate operates as follows.

In the illustrated embodiment of the invention, the current rate display consists of a six digit number with each number presented by the seven segment display of the well known and widely used construction. The input lines 117 to the display are coupled to the microprocessor 80 through the multiplexer decoding chip 118 shown as an MM 74C912 chip. The chip has its data lines 119 connected to the microprocessor 80 for reading of the digits and appropriate controls applied through the control lines to affect the necessary reading of the digit information and the decoding thereof to drive the appropriate segments for each decimal digit. The output lines 120 of chip 118 includes a driving transistor 120 as shown diagrammatically illustrated.

The third option illustrated is the totalized flow digital readout 100. The totalized flow circuit as illustrated includes a seven-segment digital display unit 122 reading to 10 positions. The illustrated embodiment includes a pair of multiplexing decoder 123 each in a standard connection similar to that shown for the current readout circuit 99. The circuit 100 provides for driving of the readout segments of the totalized display unit 28 to present the total flow beginning with the last reset.

In addition, in the illustrated embodiment of the invention, computer interface unit, 124 and 125 shown as a 1488 chip and a 1489 chip, are provided for coupling to a peripheral computer device. The interface unit 124 provide for a receipt of an interupt signal from the external computer to request coupling to the microprocessor 80. The unit 125 also couples the output of the microprocessor to the computer.

The present invention as illustrated in FIGS. 1-3 is directly applied to existing flowmeter systems such as shown in the previously identified U.S. Pat. No. 4,440,028. The outer housing is secured to the lower readout sensing detector unit with that disclosed in the present invention. The basic flow meter unit as such can be used in its present construction.

Futher, the present invention is particularly adapted to use at different installations at a given plant or installation. At any given installation, a plurality of different operating devices may require monitoring at different periods. The present invention can be readily transferred from one installation to the next with appropriate conversion of the range select system. The special program chip 86 or switching unit 87 illustrated in FIG. 6a may be used to adapt the system to the particular flow rate for each installation.

The structures of the present invention may be used in any flow-application where accurate measurement is desired and the flow system may be coupled to position the linear indicator.

For example, the present invention has also been applied in a system for monitoring the air flow to a steel carburizing furnace to regulate and monitor appropriate application of carbon to the steel. Such application requires accurate monitoring and control in order to establish proper flow and supply of carbon to the system.

The present invention thus provides an electronic flow rate meter having means to accurately detect and present the data for monitoring and recording and otherwise processing the flow-related information.

We claim:

1. A linear digital flow meter, comprising a transparent sight glass tube, a movable indicator position within said sight glass tube in accordance with the flow, a housing mounted to enclose said sight glass tube and establishing a substantial light enclosure about said glass tube, a light bank secured within said housing and establishing a light bar aligned with and passing through said tube, a plurality of individual light sensitive elements arranged in a bar fashion to the opposite side of said tube, a microprocessor coupled to read the output of each of said light sensitive elements and operable to establish a signal linearly proportional to the position of the indicator in said tube, and range selection means connected to said microprocessor for selecting the flow range being monitored.

2. The apparatus of claim 1 wherein said microprocessor includes a programmable chip including a program defining said range selection means, said chip being mounted to the microprocessor.

3. The apparatus of claim 1 having an interface module interconnected between the microprocessor and the range selection means, said interface module including means for modifying of the output signal from said light sensitive elements in accordance with the setting of said range selection means.

4. The apparatus of claim 1 including a trip select module connected to the microprocessor and including presettable means for establishing a high set point and for establishing a low set point in the response.

5. The apparatus of claim 1 including a digital readout, and a decoding unit connected to the microprocessor and the digital readout and operable to drive the digital readout to provide a continuous readout of the instantaneous flow rate.

6. A linear digital flow meter, comprising a transparent sight glass tube, a movable indicator position within said sight glass tube in accordance with the flow, a housing mounted to enclose said sight glass tube and establishing a substantial light enclosure about said glass tube, a light bank secured within said housing and establishing a light bar aligned with and passing through said tube, a plurality of individual light sensitive elements arranged in a bar fashion to the opposite side of said tube, a microprocessor coupled to read the output of each of said light sensitive elements and operable to establish a signal linearly proportional to the position of the indicator in said tube, and an adjustably mounted mask interposed between the tube and the sensitive elements and including a slot to accurately locate the light bar relative to said light sensitive elements.

7. A linear digital flow meter, comprising
 a flow passageway body having a fluid inlet and a fluid outlet with a flow passage connected between the inlet and outlet,
 a float assembly disposed within said passageway and positioned within the pasageway in accordance with the rate of flow of fluid through said passageway,
 a transparent sight glass tube secured to the one end of said passageway, a rod-like member connected to the float assembly and extended into the sight glass tube and including an indicator securd to the end of said rod-like member within said tube,
 an elongated housing secured to the lower end of said body and substantially enclosing said sight glass tube,
 said housing having a generally H-shaped cross section with a realtively heavy cross bar including an opening telescoped over said tube, said H-shaped housing defining a light chamber to one side of said tube and a detector chamber to the opposite side of said tube, said light chamber having a light transmitting slot in the cross bar and said detector chamber having a light receiving slot in the cross bar, lamp means arranged in alignment within said light chamber with said light transmitting slot in the cross bar adjacent the light chamber and transmitting a light beam bar from the light chamber through said tube, a support mounted within said detector chamber, a plurality of individual light sensitive elements secured to said support within the detector chamber and aligned to define a detecting bar located in alignment with said light receiving slot in said detector chamber to receive light from the tube passing through said slot and into the detector chamber, a shadow mask supported between said elements in alignment with said light receiving slot whereby said light sensitive elements are illuminated in accordance with the location of said rod-like member in said sight glass tube, a multiplexing module connected to said support and having a plurality of inputs connected one each to each of said elements and to a plurality of output and control leads for sequentially reading the state of each of said elements and having a common input/output line providing an output signal for each of said elements, a microprocessor having a programmed means and coupled to said multiplexing module for reading of said output signals, an A/D converter connected to said microprocessor and having an analog signal line for establishing an output analog signal proportional to the instantaneous level of said output signal, a voltage output signal means connected to said analog signal line to generate an operating voltage signal providing a voltage proportional to the position of said indicator, and an electric current drive including a plurality of individual parallel circuits, each of said parallel circuits including a field effect transistor having its main terminals connected in series to the analog signal line and an output means having an amplifying means connecting the field effect transistor to an output port means to establish an electric current signal proportional to the position of said indicator to create an electric current signal proportional to the analog voltage signal.

8. The apparatus of claim 7 wherein said housing including a bottom connector chamber secured immediately secured beneath said tube and including a first L-shaped passageway connecting the connector chamber to the light chamber and a second L-shaped passageway connecting the connector chamber to the detector chamber, said lamp means including a plurality of LED lamps, leads from said LED lamps extended through the first L-shaped passageway and terminated within the connector chamber, said light sensitive elements being phototransistors, leads from said phototransistors extended through said second L-shaped passageway and terminated in said connector chamber, a cable terminated in connector said chamber and including power leads connected to drive said LED lamps and power and signal leads connected to said phototransistor leads.

9. The apparatus of claim 7 including a range programmable module connected to the data lines of said microprocessor and including a plurality of programming lines, a switchable resistor matrix connecting a voltage supply in circuit with said programming lines whereby said module is programmed to set the range of the signals on said data lines which are operative.

10. The apparatus of claim 9 having a limit control connected to said microprocessor, said limit control including a limit programmable module connected to said microprocessor, said limit programmable module including a plurality of limit programmable level inputs, a switchable resistance matrix connecting said programmable inputs to a voltage supply whereby said module is programmed to establish limit signal levels within the range established by said range selection module.

11. The apparatus of claim 7 wherein said microprocessor has a dedicated program chip releasably secured to the memory unit, and said program chip including a program defining a range of operable signals and form a range selection chip to establish readout on one of a plurality of different ranges of flow rates.

12. A linear digital flow meter having a float assembly moving within a passageway through which fluid flows for positioning in accordance with the rate of flow of fluid therethrough, comprising a transparent sight glass tube coupled to said passageway, a movable indicator within said sight glass, means connecting the float assembly to said indicator for positioning said indicator in accordance with the positioning of the float assembly, a housing coupled to said sight glass and establishing a substantial light enclosure, a light bar aligned with the sight glass and passing through said sight glass, a plurality of individual light sensitive elements arranged in alignment in a bar fashion and aligned with the light bar to the opposite side of said glass tube, a microprocessor connected to read the output of each of said light sensitive elements, a drive circuit connected to said microprocessor and including a voltage output circuit driven by said microprocessor to establish a voltage signal linearly proportional to the position of the indicator in said sight glass tube, and a current output circuit connected to said microprocessor and driven by said microprocessor to establish a current signal linearly proportional to the position of said indicator in said sight glass tube.

13. The apparatus of claim 12 including computer interface modules connected to said microprocessor for interconnecting to a computer for receiving and transmitting of data.

14. The apparatus of claim 12 have adjustable means for setting the range of the flow rate.

15. The apparatus of claim 14 wherein said means includes a replaceable program chip releasably affixed in said microprocessor.

16. The apparatus of claim 14 having an interface module interconnected between the microprocessor and the light sensitive elements, said interface module including means for modifying of the output signal from said light sensitive elements to control the range of the output signal for given movement of said indicator.

17. The apparatus of claim 14 wherein said housing has a substantially H-shaped cross-section having a cross arm and having an opening in the cross arm of said housing, said glass tube being located within said opening and said housing having a lamp chamber to one side of said cross arm and a detector chamber to the opposite side of said cross arm, said corss arm having light transmitting slots to the opposite sides of said tube opening, a shadow mask adjacent the cross arm in said detector chamber, adjustable mounting means securing the shadow mask in place with a slot precisely aligned with the slot in said cross arms.

18. The apparatus of claim 14 including a trip select module connected to the microprocessor and including presettable means for establishing a high set point and for establishing a low set point in the response.

19. A linear digital flow meter, comprising
   a flow passageway body having a fluid inlet and a fluid outlet with a flow passage connected between the inlet and outlet,
   a float assembly disposed within said passageway and positioned within the passageway in accordance with the rate of flow of fluid through said passageway,
   a transparent sight glass tube disposed to the one end of said passageway, a rod connected to the float assembly and extended into the sight glass tube,
   an indicating disc connected to the rod within said tube, an elongated housing secured to the lower end of said body and enclosing said sight glass tube and having a visual slot portion exposing a slot like portion of said tube for visual view of the tube,
   a rod connected to the float assembly and extended into the sight glass tube,
   an indicator connected to the rod within the sight glass tube whereby the position of the indicator within the sight glass tube is proportional to the rate of flow,
   said housing having a generally H-shaped cross section with a relatively heavy cross bar including a tube opening telscoped over said tube, said H-shaped housing defining a light chamber to one side of said tube and detector chamber to the opposite side of said tube and having elongated light transmitting slots to the opposite sides of said tube opening,
   a mounting board located in said detector chamber,
   a plurality of LED diode lamps arranged in alignment with said light chamber and said light transmitting slot in the cross bar adjacent the light chamber and transmitting light through the tube into the detector chamber,
   a plurality of phototransistors secured to said mounting board and arranged in alignment with said light transmitting slots,
   a shadow mask interposed between said mounting board and said cross bar, said mounting board and said mask being laterally adjustable relative to said light transmitting slot, whereby said phototranasistors are illuminated in accordance with the length of said rod projecting into said sight glass tube,
   a multiplexing module having a plurality of inputs connected one to each of said phototransistors and plurality of output and control leads, latch circuit means connected to said multiplexing module for sequentially reading the state of each of said phototransistors, a common input/output line connected to said latch circuit means providing an output signal for each of said lamps in sequence.
   a microprocessor having a programmed means,
   a coupling circuit coupled to said latch circuit means for reading of said successive signals,
   a programmable range selection means connected to said microprocessor and programmed to define an operable range of signals and including a plurality of programming means operable to adjust the input signals to different flow ranges,
   an D/A converter connected to said microprocessor and having an anlog signal line and establishing an output signal proportional to the instantaneous level of said flow related signal,
   a voltage output signal means connected to said analog signal line to generate an operating voltage signal providing a voltage proportional to the position of said indicator, and
   a current drive including a plurality of individual parallel circuits, each of said current drive circuits including a field effect transistor having its main terminals connected in series to the analog signal line and an output stop having an amplifying means connecting the field effect transistor to an output port means to establish a current signal proportional to the position of said indicator to create a current signal proportional to the analog voltage signal.

20. The apparatus of claim 19 wherein said housing includes a bottom connector chamber secured immediately beneath said tube and including a first L-shaped passageway connecting the connector chamber to the light chamber and a second L-shaped passageway connecting the connector chamber to the detector chamber, leads from said LED lamps extended through the first L-shaped pasageway and terminated within the connector chamber, leads from said phototransistors extended through said connector chamber, a cable terminated in said connector chamber and including power leads connected to said leads from said LED lamps to drive said LED lamps and power and signal leads connected to said leads from said phototransistors.

21. The apparatus of claim 19 having a limit control input connected to said microprocessor, said limit control including a programmable interface module connected to said microprocessor, said programmable module including a plurality of limit programmable level inputs a voltage supply connected to said inputs whereby said module is programmed to establish limit signal levels within the range established by said range selection means.

* * * * *

UNITED STATES PATENT AND TRADEMARK OFFICE
CERTIFICATE OF CORRECTION

PATENT NO. : 4,774,676
DATED : September 27, 1988
INVENTOR(S) : Wallace I. Stenzel et al It is certified that error appears in the above-identified patent and that said Letters Patent is hereby corrected as shown below:

IN THE CLAIMS

Col. 10, lines 60-61, Claim 7: After "an" delete "indicator securd to the end of said rod-like member" and substitute therefor ---indicating end---

Signed and Sealed this

Sixth Day of November, 1990

*Attest:*

HARRY F. MANBECK, JR.

*Attesting Officer*     Commissioner of Patents and Trademarks